(12) United States Patent
Lerner et al.

(10) Patent No.: US 10,503,968 B2
(45) Date of Patent: Dec. 10, 2019

(54) IDENTIFYING A LOCAL COORDINATE SYSTEM FOR GESTURE RECOGNITION

(71) Applicant: Intel Corporation, Santa Clara, CA (US)

(72) Inventors: Alon Lerner, Holon (IL); Maoz Madmony, Beit Kama (IL)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 15/076,882

(22) Filed: Mar. 22, 2016

(65) Prior Publication Data

US 2017/0277942 A1   Sep. 28, 2017

(51) Int. Cl.
```
G06K 9/00    (2006.01)
G06K 9/52    (2006.01)
G06F 3/01    (2006.01)
G06K 9/42    (2006.01)
G06F 9/52    (2006.01)
G06K 9/62    (2006.01)
```
(52) U.S. Cl.
CPC ......... G06K 9/00355 (2013.01); G06F 3/017 (2013.01); G06F 9/52 (2013.01); G06K 9/42 (2013.01); G06K 9/6215 (2013.01)

(58) Field of Classification Search
None
See application file for complete search history.

(56) References Cited

U.S. PATENT DOCUMENTS

| | | | |
|---|---|---|---|
| 6,788,809 B1 | 9/2004 | Grzeszczuk et al. | |
| 9,501,826 B2* | 11/2016 | Seshadrinathan | H04N 5/357 |
| 2008/0278584 A1 | 11/2008 | Shih et al. | |
| 2013/0285903 A1* | 10/2013 | Langridge | G06F 3/011 345/157 |
| 2015/0181198 A1* | 6/2015 | Baele | G06T 7/80 348/46 |
| 2015/0193003 A1* | 7/2015 | Yamada | G06F 3/017 345/156 |
| 2017/0277942 A1* | 9/2017 | Lerner | G06K 9/00355 |

FOREIGN PATENT DOCUMENTS

EP    2346239    7/2011

OTHER PUBLICATIONS

PCT International Search Report and Written Opinion of the International Searching Authority for International Application No. PCT/US2017/015129, dated May 2, 2017, 13 pages.
International Preliminary Report on Patentability received for PCT Patent Application No. PCT/US2017/015129, dated Oct. 4, 2018, 12 pages.

* cited by examiner

Primary Examiner — Tahmina N Ansari
(74) Attorney, Agent, or Firm — Finch & Maloney PLLC

(57) ABSTRACT

Identifying a local coordinate system is described for gesture recognition. In one example, a method includes receiving a gesture from a user across a horizontal axis at a depth camera, determining a horizontal vector for the user based on the received user gesture, determining a vertical vector; and determining a rotation matrix to convert positions of user gestures received by the camera to a frame of reference of the user.

20 Claims, 6 Drawing Sheets

IDENTIFYING A LOCAL COORDINATE SYSTEM FOR GESTURE RECOGNITION

FIELD

The present description relates to gesture recognition for computing systems and in particular to coordinate systems for gesture recognition.

BACKGROUND

The proliferation of inexpensive cameras and image signal processing has resulted in many new systems that replace normal computerized input systems with cameras. Television remote controls, game controllers, and computer keyboards and mice have been replaced in some cases with a set of cameras and microphones in televisions, gaming consoles, and computers. For some systems, the camera is attached to the main system and, in other cases, the camera is a separate part that can be mounted in a place that provides good visibility of possible users. The cameras observe hand and body motions of the user and interpret these motions as commands.

A gesture or body movement recognition system presents many difficulties. It is difficult for a set of cameras to view, analyze and interpret a gesture as quickly as it is to receive a button press. There are difficulties with determining whether a user is gesturing to the camera or to another person. There are difficulties with recognizing and distinguishing a hand in a crowded space with poor lighting. There are also difficulties with distinguishing different parts of a hand. Further difficulties are associated with smoothing the motion of the tracked point on a hand and with the differences between a tracked image of a hand and the screen resolution.

Most gesture and body control systems respond to side-to-side and up and down movement. The range of gestures is therefore only two-dimensional. Recently multiple camera systems allow depth or distance from the camera to be determined. This opens up new avenues for gesture and body control because the camera can determine movement also in the third dimension. For the user, this movement is front to back or towards and away movement.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In some cases, the position of the camera is not aligned with the posture of a user. This may be because the camera is not well placed or because the user is not aligned with the camera. As an example with a notebook computer, the camera is normally attached to the top of the display bezel. The user places the computer display at an angle most comfortable for viewing, not for gestures. The computer may be placed to the side out of the way to make room for other items on a table or desk. In addition, a notebook computer user may sit at some angle to the screen when the keyboard is not being used. If the user performs gestures, the camera cannot easily know which direction is side-to-side and which direction is forward and back.

Due to the short distance between a user's hand and the camera for a typical notebook computer use and due to the subtle movement of close range gestures, the gesture recognition system is very likely to misinterpret gestures. For example a twenty centimeter left-right swipe motion at a thirty degree angle to the camera has a ten centimeter motion on the front-back (depth) axis of the camera.

As described herein, the coordinate system of a camera system may be compared to the coordinate system of the user. Under close to ideal conditions of alignment, the user performs the gestures directly facing the camera. The coordinate systems are aligned and the quality of a gesture recognition system may be quite high.

Figure 1:
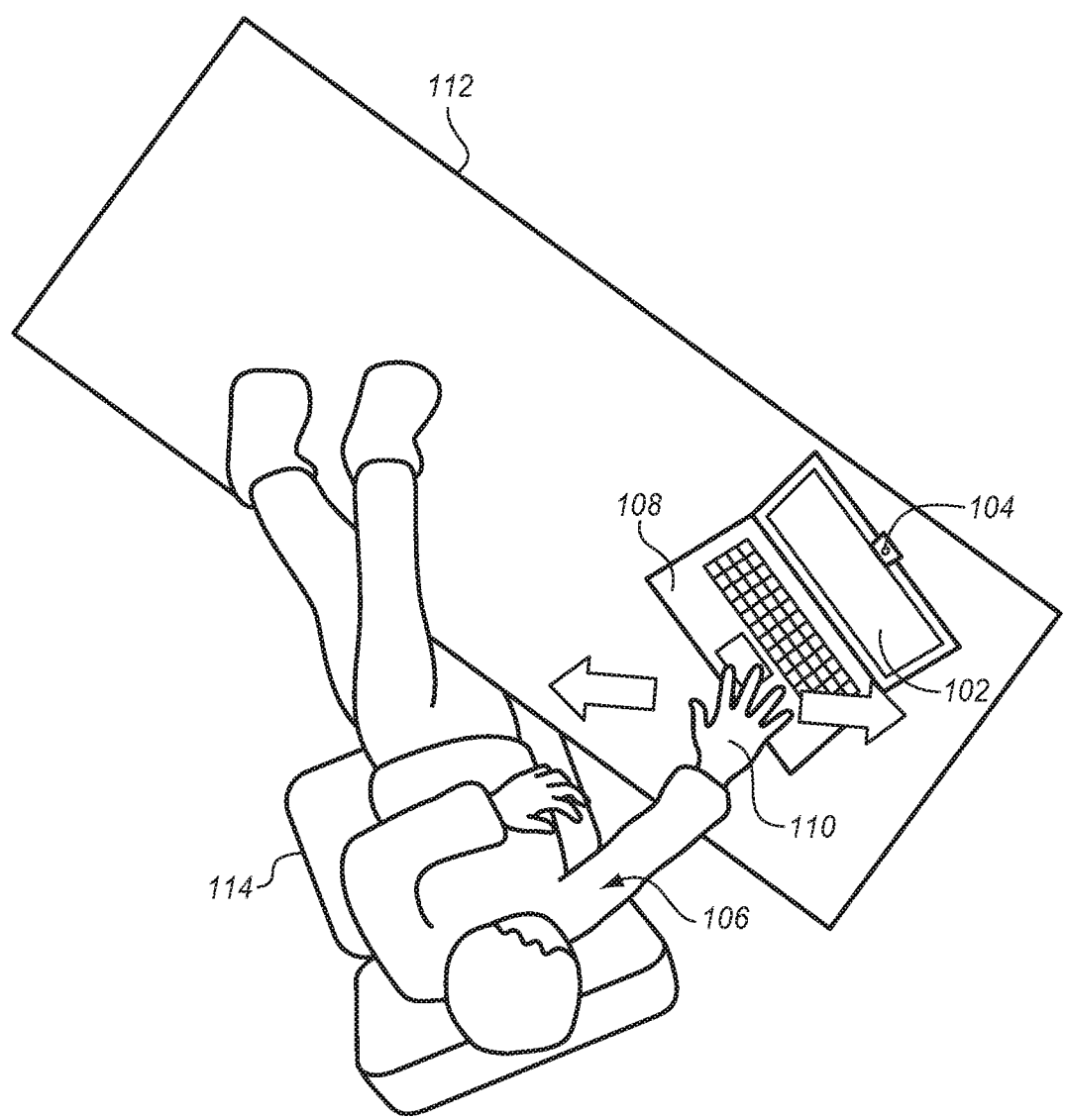
FIG. 1 is an overhead top view diagram of a user controlling a computer using hand gestures according to an embodiment.

FIG. 1 is an overhead top view diagram of a user controlling a notebook computer using hand motions. When a user interacts with a depth-based gesture controlled system, commands may be sent without the use of an intermediary device, such as a mouse or touchpad. The wave of a hand may control the location of the mouse or touchpad, a tap may click a button, and other gestures may control other tasks. As shown such systems have three basic components: a computer or display screen 102, a depth camera 104, and the user 106. When these three systems are aligned, the user's gestures may easily be identified. As shown, the computer 108 is on a table 112, while the user 106 is seated on a chair 114. The chair is not aligned to the table and the user is not aligned to the table.

In the illustrated example, the camera is attached to the upper bezel of the screen which is attached as part of a complete notebook computer 108. Attached cameras are common to tablets, convertibles, or all-in-one computers, smart phones, media players, televisions, and remote conference terminals, among other systems. The camera is positioned in a known, stationary position, relative to the screen so that the camera and screen can be aligned at the factory. In other systems, the camera is a peripheral device that may or may not be attached to the screen and that can be placed in any position around the room.

To further complicate matters, the user 106 can also stand, sit, or lean at any unknown angle in relation to the screen, the camera or both. As a result, when the user moves his hand left to right 110 as shown by the arrows, the camera does not see this as left to right. There is a left to right motion as well as a front to back motion from the perspective of the camera. There may also be an up and down component. As a result, the hand motion may be misinterpreted. As an example, the gesture might be misinterpreted as a "click" gesture rather than a "move" gesture.

For the user 106, the true horizontal axis may be regarded as parallel to the edge of the table. His left-right swipe motion may be parallel to this axis or somewhere between a parallel to the table and a parallel to the direction of the chair, as shown. However when the camera takes images of the gesture from the camera's point of view, the motion is diagonal. The camera, in this case is positioned parallel to the edge of the table but in some cases, the notebook computer may be angled with respect to the table and the chair.

A transformation that aligns the user and the camera's local coordinate systems is found as described herein. After alignment, even though the user 106 might be moving his hand 110 at an angle to the camera 104, his gestures will be interpreted as though he were facing the camera at an optimal angle. Furthermore, once such a transformation is defined, any changes in the user's gesture orientation relative to the camera can be tracked over time. By tracking the changes the transformation can be updated so that the gestures remain aligned to the camera. This approach may be used for any camera gesture system and is particularly useful when working with close range systems where the user is less than a meter away from the camera.

As described herein, the user's local coordinate system is determined and then aligned to the camera's coordinate system using a rotation matrix. A Cartesian coordinate system may be determined using three non-collinear points $P_1$, $P_2$, $P_3$, i.e. points which do not lie on the same line. The three points may then be used to determine three vectors $V_1$, $V_2$, $V_3$, as follows:

$$V_1 = P_2 - P_1, \quad V_2 = P_3 - P_1,$$

The vectors are then normalized as follows:

$$V_1 = V_1/\|V_1\|, \quad V_2 = V_2/\|V_2\|$$

The normalized vectors are then used to define an orthonormal or Cartesian coordinate system of $V_1$, $V'_2$, $V_3$ as follows:

$$V_3 = V_1 \times V_2, \quad V'_2 = V_1 \times V_3$$

The camera's local coordinate system is defined by the camera's horizontal and vertical axes and by the direction in which the camera is pointing. The user's local coordinate system is not well defined as it does not necessarily align with the orientation of the user's body or any other part of the user. The user's local coordinate system is determined simply by the orientation in which the user performs the gesture.

Figure 2:
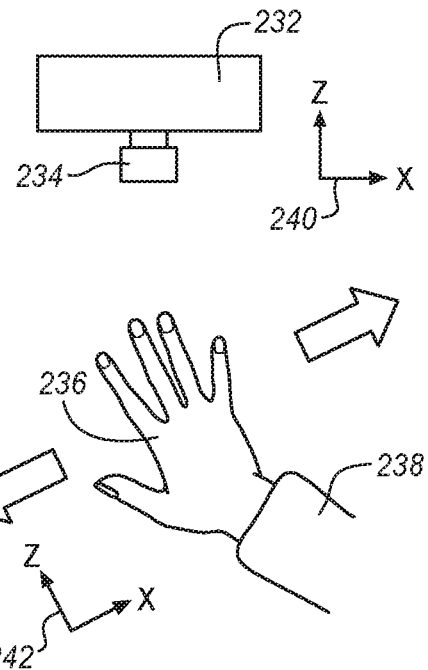
FIG. 2 is an overhead top view diagram of a user performing a left right gesture to control a computer including two different frames of reference according to an embodiment.

In some embodiments, the user's coordinate system may be defined by asking the user to perform two simple gestures: "swipe left right" and "swipe up down". FIG. 2 is an overhead top view diagram of a swipe left right gesture in front of a notebook computer. The computer 232 has a camera 234 mounted to it or placed near it. The camera has a frame of reference 240 that is orthogonal to the screen of the computer. A user 238 moves a hand 236 in front of the camera as shown by the arrows in a left right gesture that is in a second frame of reference 242. As shown, the user gesture has an x component and a z component while a properly aligned left to right gesture has only an x component in the camera's reference frame 240. The gesture may also have a vertical or z component, not shown.

Figure 3:
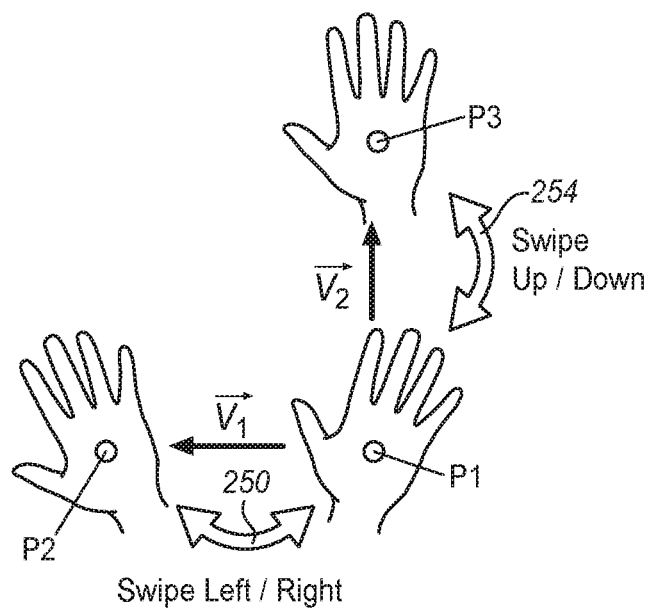
FIG. 3 is a diagram of two user gestures for controlling a computer and for defining a user's frame of reference according to an embodiment.

FIG. 3 is a diagram of these two user gestures: "swipe left right" and "swipe up down" from the perspective of the camera. The start and end of the gestures defines the position for the three points $P_1$, $P_2$, $P_3$, discussed above and as shown in FIG. 3. The user's hand moves in the first gesture 250 between $P_1$ and $P_2$ and in the second gesture 254 between $P_1$ and $P_3$. The range of motion is not important because the vectors are normalized.

Figure 4:
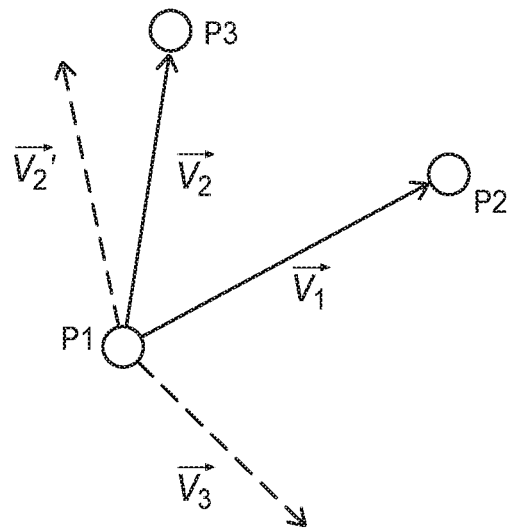
FIG. 4 is a diagram of points and vectors that may be used to define a transformation matrix according to an embodiment.

The vector $V_1$ is defined by the left and right most points. The vector $V_2$ is defined by using the top and bottom most points. The user's local coordinate system is defined by these two vectors. The point $P_1$, as seen in FIGS. 3 and 4, is the starting point for the left right and up down vectors. This may be used as the origin point of the coordinate system and is defined as $P_{origin}$. In practice many users have a conceptual mental origin point and start gestures at about the same place in the space around the screen. Using this as the origin enhances the gesture recognition system.

FIG. 4 is a diagram of the three points $P_1$, $P_2$, $P_3$, established by the two user gestures and the vectors, $V_1$, and $V_2$, that connect $P_1$ to $P_2$, and to $P_3$ and are determined using these points. As shown $V_3$ may be determined using $V_1$ and $V_2$. In addition $V_2$ may be determined using a gravity sensor or by reference to floor, ceilings, tabletops, posts, or other items so that a vertical user gesture may not be required. These three vectors define the user's coordinate system. $V'_2$ may be determined using $V_1$ and $V_3$. Using these vectors for the user's coordinate system, a transformation may be found that aligns these directions with a standard or reference coordinate system, such as the coordinate system of the camera or the screen.

A transformation matrix for the two frames of reference may be generated by taking the vectors of the user's coordinate system ($V_1$, $V'_2$, $V_3$) and putting them as columns in a 3 by 3 matrix M. This gives a rotation matrix which rotates the standard or camera's coordinate system (i.e. x=(1,0,0), y=(0,1,0) and z=(0,0,1)), to the gesture's coordinate system.

Therefore, to transform a point P, which has the coordinates (Px, Py, Pz) into the user's local coordinate system, $P - P_{origin}$ is multiplied by the rotation matrix M and then $P_{origin}$ is added back. This gives a new point P'. Simply put, the two coordinate systems are placed in the same position. The distance of the point P from origin of the user's coordinate system is then translated to a distance from the origin of the standard coordinate system.

When the user makes a gesture, the positions for the gesture are applied to the rotation matrix M to convert them to positions in the user gesture's coordinate system. New vectors are determined based on the rotated positions. The new vectors are then applied to a gesture recognition system.

Since the user may change his orientation and position, for example when he moves, turns or shifts in his chair, any changes in the user's gesture orientation may be tracked and the transformation may be updated accordingly. For example, if the user swipes his hand left to right, the gesture's direction vector may be computed to see how well it matches the horizontal axis of the user's coordinate system. If the difference in orientations is not negligible, then the user's coordinate system is rotated, by modifying the rotation matrix to align with the axis of the new gesture. This may be done to greatly improve the accuracy of the gesture recognition system without asking the user to provide calibration or adjustment gestures.

The amount of change required before the rotation matrix is changed may be adapted to suit the particular system. In use, the user may be imprecise with gestures so that the coordinate system of the user's gestures may vary be 5 or 10 degrees from gesture to gesture with no real pattern. This kind of variation may be accommodated by the gesture recognition system. A larger change e.g. more than twenty degrees, may be caused by the user changing positions. In this case the rotation matrix may be adjusted. A threshold may be used to detect large changes. In addition, the system may observe multiple gestures so that the rotation matrix is not changed for a single tilted gesture but only after some number of gestures, e.g. three or four gestures, that show a similar change in orientation.

Figure 5:
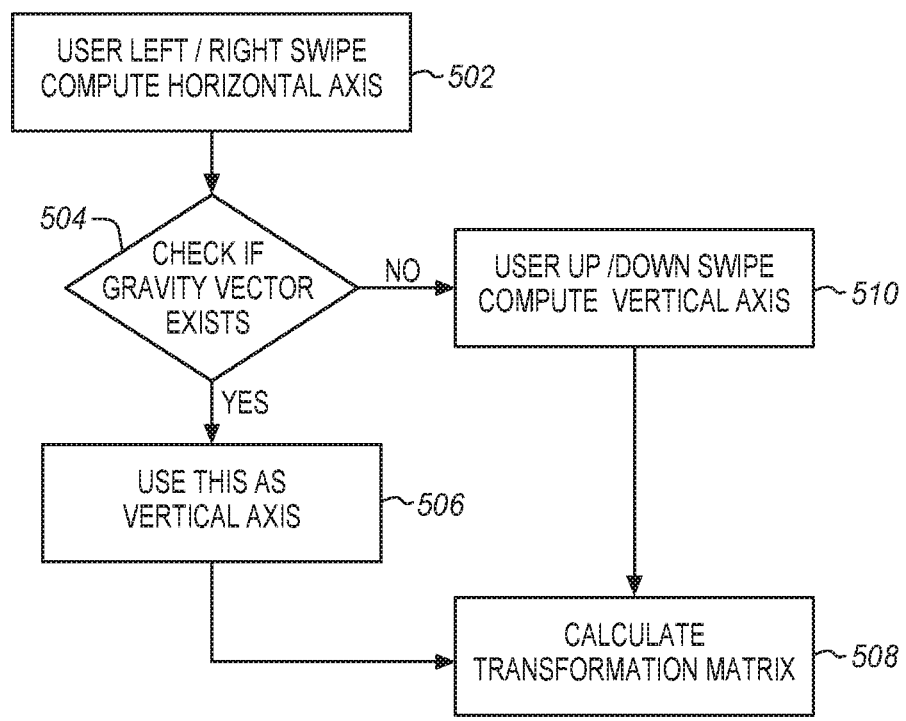
FIG. 5 is a process flow diagram of generating a transformation matrix according to an embodiment.

FIG. 5 is a process flow diagram of determining a coordinate system or axis for a user gesture. The user's local gesture coordinate system is defined and then a transformation is used to convert gestures to the camera's frame of reference. The system may be initialized in any of a variety of different ways. In some embodiments, the user is asked to perform two orthogonal gestures, swipe left/right 502 and swipe up/down 510. The path of the hand while performing each of these gestures is used as the horizontal and the vertical axes of the user's local coordinate system. By taking the extreme or end points of these motions (i.e. the top/bottom most and left/right most points) two vectors, a horizontal and a vertical are defined.

Using these two vectors a coordinate system can be defined as shown in FIG. 4. Accordingly, the process begins at 502 by receiving the left/right swipe gesture at the camera. The gesture is then used to determine a horizontal axis defined above by $V_1$.

At 504, the system determines whether it has an accurate vertical direction. As an example, if the camera has an IMU (Inertial Measurement Unit) device or some other gravity or direction sensor attached to it, then the camera system can determine which way is up or down. In many cases, an IMU device provides the local vertical axis relative to the earth's gravitational field. In most cases a user's up/down swipe motion will closely correspond to the local vertical axis. This happens regardless of user posture and direction. Accordingly at 506, the local vertical axis is used as the user's vertical axis If there is no available local vertical axis, then at 510, the user's performs an up/down swipe and the user's vertical axis is determined. If the user gestures are observed as not aligning with the local vertical direction, then the system may ask for a vertical gesture for comparison purposes.

In some embodiments, the camera is able to change its tilt angle through the use of a motor. The camera may then be adjusted to align with the local vertical direction. If there is no IMU, gravity sensor or similar device, the camera may still determine and optionally adjust for the local vertical by observing objects in a room or outside. As an example, the camera and system may identify the floor or ceiling and infer that the vertical direction is orthogonal from a floor or ceiling. The camera system may identify rectangular window frames and infer that the windows are mounted level and true and therefore aligned with the local vertical. Even if the camera cannot change its tilt orientation, by analyzing the depth data from the camera, it is possible in some cases to identify the floor, table or ceiling and infer the vertical direction from the environment.

The decision block 504 may be used in various ways, depending on the configuration of the computing system. If there is an IMU associated with the camera, the system may first check for a valid signal. The result is that there is a vertical axis and the system goes to 506. If there is no IMU, the system may be configured accordingly so that it does not look for that valid signal. If there is no valid signal and no IMU, then the system may try to determine a vertical direction using the environment, such as windows, doors, tables, floors, ceilings, etc. If this is possible, then the process may still go to 506. Otherwise, the process goes to 510 to ask the user for a gesture. Alternatively, the decision 504 may be avoided entirely and the user may be asked for a vertical gesture each time. In general, a determination of the vertical based on the environment whether from a sensor or local objects will be more accurate than observing a user gesture.

At 508 using the determined user horizontal and vertical directions, a transformation matrix is calculated. The transformation matrix is then used in interpreting gestures as described herein.

Figure 6:
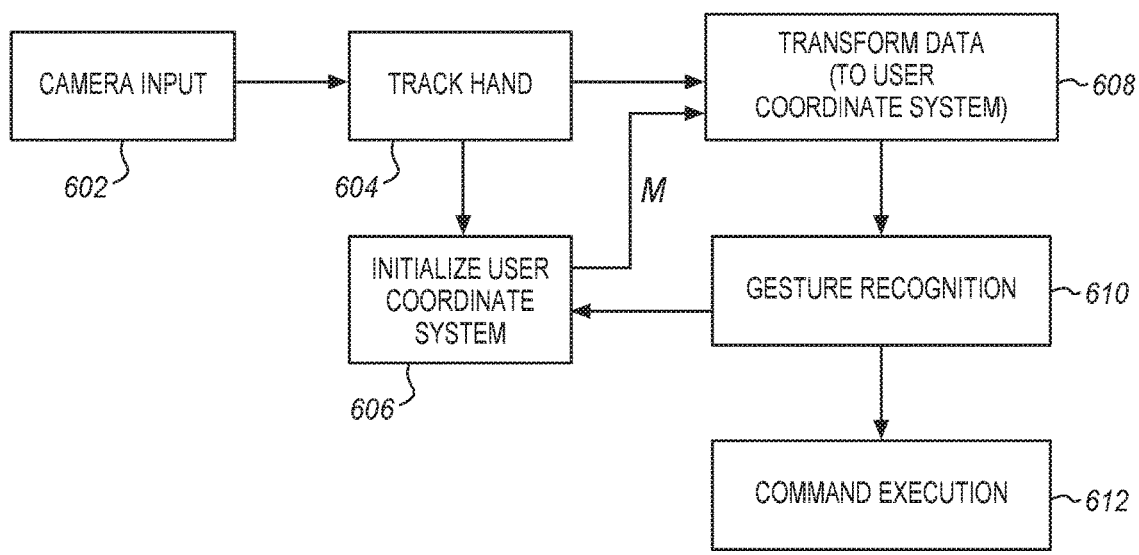
FIG. 6 is a process flow diagram of executing commands in a computing system in response to hand gestures according to an embodiment.

FIG. 6 is a process flow diagram for a gesture recognition system with an integrated alignment module. At 602, a camera system, typically a depth camera with two more optical sensors, captures an image with depth information of a user hand. A tracking module 604 tracks the hand using images from the camera 602 and notes end points for any possible gestures.

When a new user is detected for the first time a user initialization module 606 initializes the user's coordinate system as described above for example in the process of FIG. 5. The user initialization module also updates the user's coordination system periodically or if a large variation is detected. The user's local coordinate system is used by the user initialization module to define a rotation matrix M by placing the system's axes as columns in a matrix and an origin point. This matrix and origin point are provided to a data transformation module 608.

In the data transformation module each point P given in the standard coordinate system, for example the camera's coordinate system is rotated by the rotation matrix M to return a point P' in the user's local coordinate system. In this manner the data transformation module transforms all the input points from the hand tracking module 604. These corrected motions may then be provided to a gesture recognition module 610 in a coordinate system that is correctly aligned with the user's gestures.

Since the user is not static and can move freely, the transformation which aligns the camera and user coordinate systems may change over time. Instead of asking the user to perform the calibration gestures periodically, the angle between a gesture which should align with one of the axes, such as a swipe, tap or click may be compared to the current user coordinate system. If the difference in angles between the axis that has been inferred from the gesture and the axis determined by the user coordinate system module is large, e.g. more than some predefined threshold, then a new coordinate system is determined by the user coordinate system module 606. This module is coupled to the gesture recognition module to check the alignment of recognized gestures. If the difference in orientation angles persists over time, then the user's coordinate system (860) is updated. This may be done with a new gesture or by averaging the stored axes and the recognized gesture axes or in other ways.

While the description above is in the context of hand gestures, it may also be applied to other types of gestures, including eye tracking and body movements. In some cases, the user has a controller, stylus, or other instrument that is used to provide gestures. The described systems and techniques may also be applied to gestures made with the hand or body using a held or attached instrument. The described system and method may be made integral to any depth-based gesture recognition system and may be integrated into a software development kit or other type of software system for a depth sensing camera system.

Figure 7:
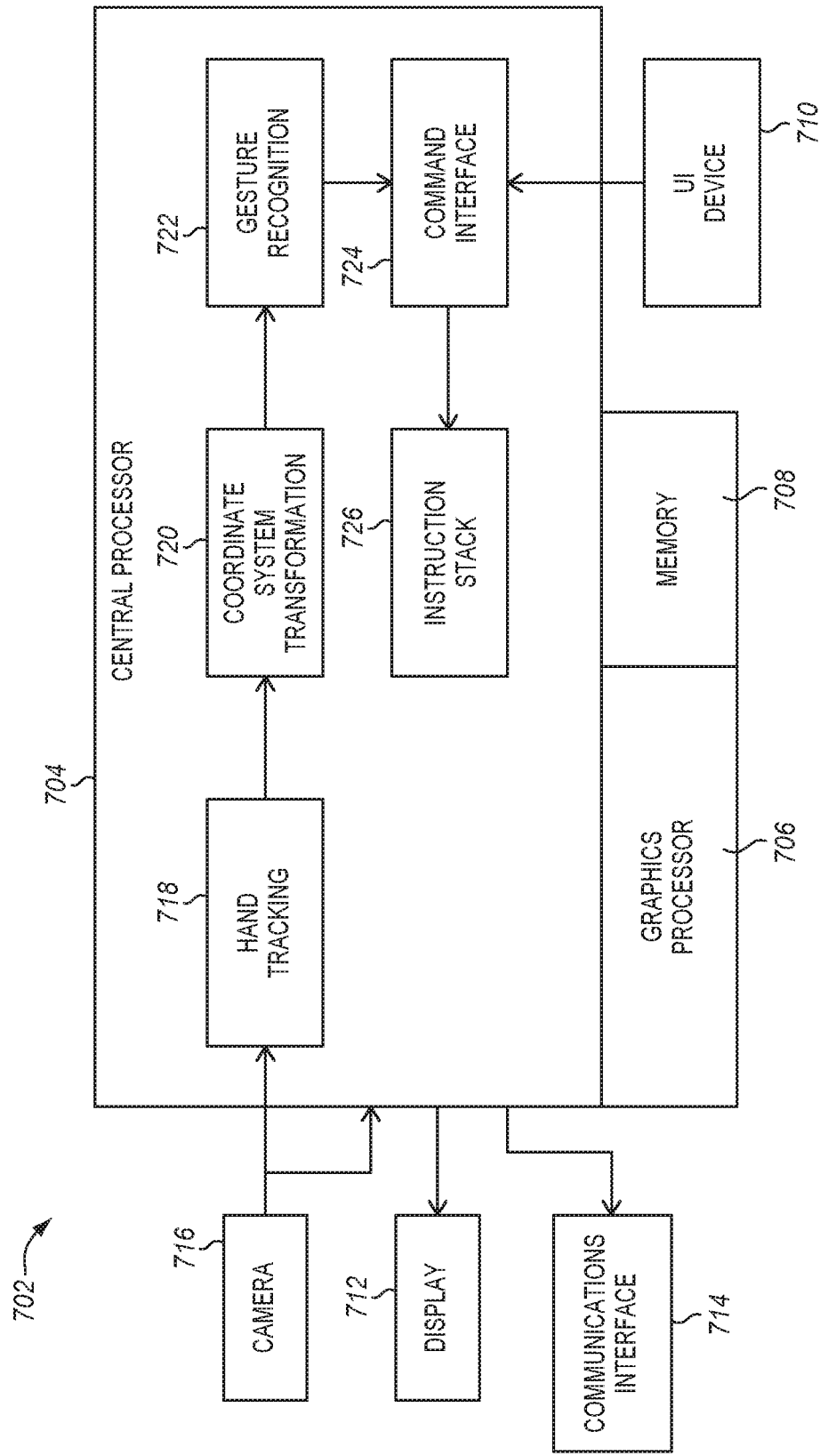
FIG. 7 is a block diagram of a computing device incorporating gesture recognition according to an embodiment.

FIG. 7 is a block diagram of a system for implementing the gesture recognition described herein according to an embodiment. A system 702 may include a central processor 704, a graphics processor 706, and memory 708. These may be in the same or different integrated circuit dies, and the same or different packages. The central processor is coupled to one or more user interface devices 710, such as touch screens, buttons, and cursor control devices. The user interface devices are coupled to a command interface 724 that is coupled to an instruction stack 726. The instruction stack is a part of and supplies instructions for execution by the central processor, graphics processor, and memory. The memory 708 may store image data, hand model parameters, target positions, end-effector positions, finger labels, model selection gesture libraries, coordinate system parameters, and any other data as discussed herein as well as commands and instructions for execution by the central processor.

The system is also coupled to a camera 716 such as a depth camera with multiple spaced apart image sensors, which supply input video frames to the processor 704 and to a hand tracking system 718. The camera may include internal processing an image signal processor or other components (not shown). The central processor 704 includes the hand tracking system 718 which provides recognized hand feature points to a coordinate system transformation module 720. The coordinate system transformation module generates vectors in the user's coordinate system and compares them to the standard coordinate system, such as the camera coordinates system, and transforms the reference points for any gestures to the standard coordinate system. The reference points for the gestures are then transferred in the standard coordinate system to the gesture recognition system 722. This system recognizes and interprets poses and movements of the recognized hand as authentication, commands, or other information and passes the recognized commands to the command interface 724.

The coordinate system transformation module may also observe user gestures when in use and continue to compare gestures to the user's coordinate system. If the gestures move away from the user's coordinate system, then the module determines a modified or new user coordinate system for use in future transformations.

As shown, in some examples, the feature recognition, coordinate system transformation, and hand tracking may be implemented by the central processor 704. In other examples, one or more or portions of these may be implemented by the graphics processor 706 or another processing unit.

The graphics processor 706 may be implemented via software or hardware or a combination thereof. Some of the functions described herein may be performed by an execution unit (EU) of the graphics processor.

Figure 8:
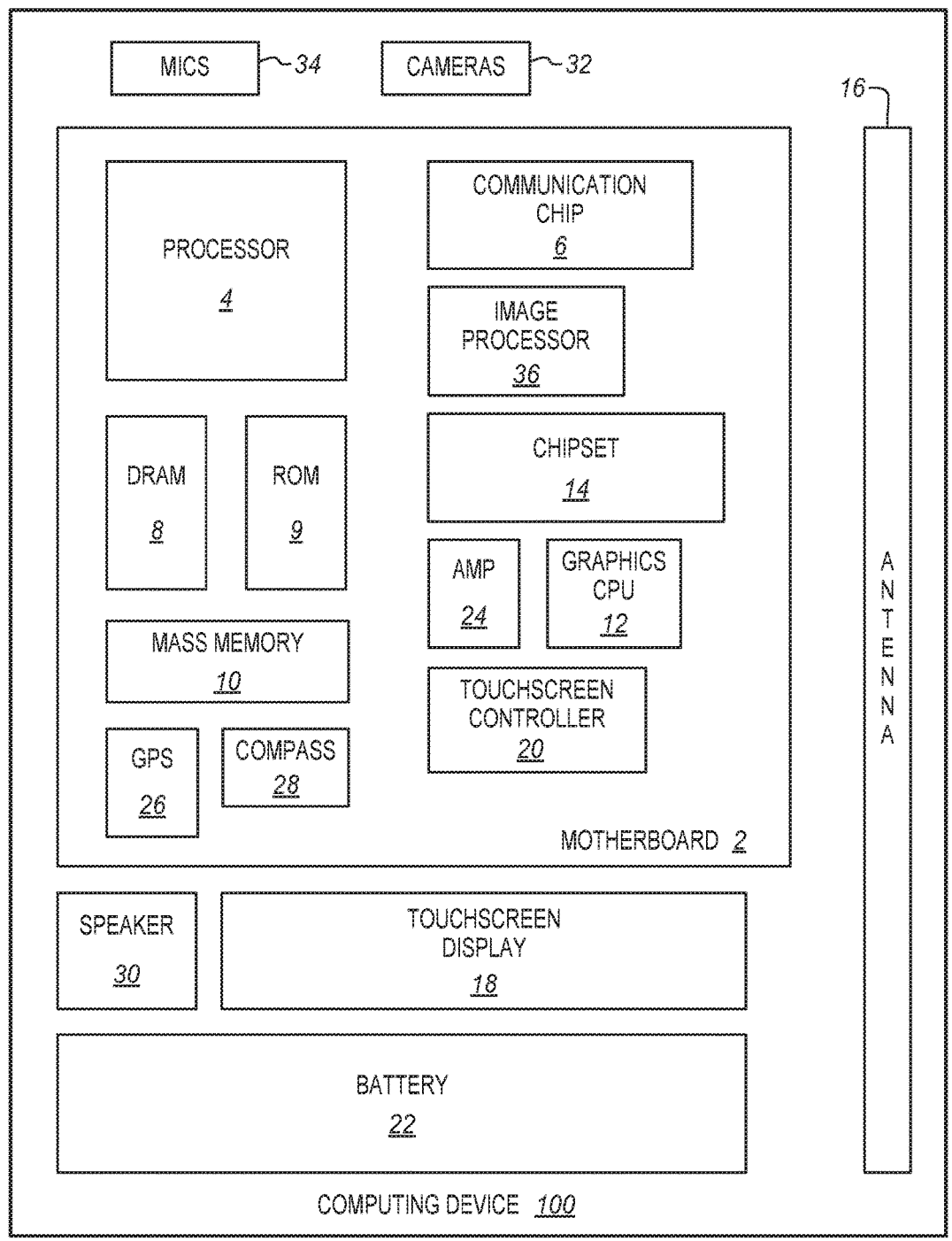
FIG. 8 is an alternative block diagram of a computing device incorporating gesture recognition according to an embodiment.

FIG. 8 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 including any depth sensors or proximity sensor are coupled to an optional image processor 36 for depth or distance analysis, image understanding and other processes as described herein. The processor 4 is coupled to the image processor to drive the process with interrupts, set parameters, and control operations of image processor and the cameras. Image processing and gesture recognition may instead be performed in the processor 4, the graphics CPU 12, or in any other device. Determined commands are sent to the processor for execution.

In various implementations, the computing device 100 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a gesture from a user across a horizontal axis at a depth camera, determining a horizontal vector for the user based on the received user gesture, determining a vertical vector, and determining a rotation matrix to convert positions of user gestures received by the camera to a frame of reference of the user.

Further embodiments include receiving a second user gesture at the depth camera, rotating positions of the second user gesture to positions of the frame of reference of the user, and recognizing the second user gesture using the frame of reference of the user.

Further embodiments include executing a command corresponding to the recognized user gesture.

Further embodiments include determining a second horizontal vector for the user based on the received second user gesture, comparing the second horizontal vector to the first horizontal vector, and if the second horizontal vector differs from the first horizontal vector by more than a threshold then determining a new rotation matrix using the second horizontal vector.

In further embodiments determining a vertical vector comprises determining a local direction of gravity using a sensor associated with the camera.

In further embodiments determining a vertical vector comprises recognizing an object in the field of view of the camera and determining a vertical vector based on the orientation of the recognized object.

In further embodiments determining a vertical vector includes receiving a third gesture from the user across a vertical axis at the camera, and determining a vertical vector for the user based on the received third gesture.

In further embodiments determining a horizontal vector includes determining end positions of the horizontal gesture, defining a vector based on the end positions, and normalizing the vector.

In further embodiments the user gesture is a hand gesture.

In further embodiments determining a rotation matrix includes determining an orthonormal coordinate system defined by the horizontal vector, the vertical vector and a third orthogonal vector, normalizing the determined vectors, generating a first matrix by taking the vectors as columns in a 3×3 matrix as the rotation matrix.

In further embodiments the received gesture has a starting point on the horizontal axis and an end point on the horizontal axis, the method further comprising using the starting point as the origin of the orthonormal coordinate system.

Some embodiments pertain to a computer-readable medium having instructions thereon that when operated on by the computer cause the computer to perform operations that include receiving a gesture from a user across a horizontal axis at a depth camera, determining a horizontal vector for the user based on the received user gesture, determining a vertical vector, and determining a rotation matrix to convert positions of user gestures received by the camera to a frame of reference of the user.

Further embodiments include determining an orthonormal coordinate system for the user gesture defined by the horizontal vector, the vertical vector and a third orthogonal vector, and using the user gesture coordinate system to determine the rotation matrix.

In further embodiments determining a rotation matrix comprises normalizing the horizontal vector, the vertical vector and a third orthogonal vector, generating a first matrix by taking the vectors as columns in a 3×3 matrix as the rotation matrix.

In further embodiments the received gesture has a starting point on the horizontal axis and an end point on the horizontal axis, the method further comprising using the starting point as the origin of the orthonormal coordinate system.

Some embodiments pertain to an apparatus that includes a depth camera to receive a gesture from a user across a horizontal, a hand tracking module to determine a horizontal vector for the user based on the received user gesture and to determine a vertical vector, and a coordinate system transformation module to determine a rotation matrix to convert positions of user gestures received by the camera to a frame of reference of the user.

Further embodiments include a gesture recognition module to recognize a second user gesture using the frame of reference of the user.

In further embodiments the coordinate system transformation module determines a vertical vector by determining a local direction of gravity using a sensor associated with the camera.

In further embodiments the coordinate system transformation module determines a horizontal vector by determining end positions of the horizontal gesture, defining a vector based on the end positions, and normalizing the vector.

In further embodiments the received gesture has a starting point on a horizontal axis and an end point on the horizontal axis, and wherein the hand tracking module determines the horizontal vector using the starting point as the origin of the vector on the horizontal axis and the end point as a magnitude and a direction.

What is claimed is:

1. A method for aligning a user's coordinate system with a depth camera's coordinate system to facilitate gesture recognition, the method comprising:
    requesting a user to perform one or more gestures, the request to determine the user's coordinate system;
    receiving a horizontal swipe gesture from the user at the depth camera, in response to the request, the received horizontal swipe gesture having a path defined by a leftmost endpoint and a rightmost endpoint;
    determining a horizontal vector based on the leftmost endpoint and the rightmost endpoint of the received horizontal swipe gesture, wherein the horizontal vector is the horizontal axis of the user's coordinate system;
    determining a vertical vector, wherein the vertical vector is the vertical axis of the user's coordinate system; and
    determining a rotation matrix relative to the coordinate system of the depth camera, based on the horizontal vector and the vertical vector, to convert positions of user gestures received by the depth camera to a frame of reference of the user, thereby aligning the user's coordinate system with the depth camera's coordinate system.

2. The method of claim 1, further comprising:
    receiving an additional user gesture at the depth camera;
    rotating positions of the additional user gesture to positions of the frame of reference of the user; and
    recognizing the additional user gesture using the frame of reference of the user.

3. The method of claim 2, further comprising executing a command corresponding to the additional user gesture.

4. The method of claim 2, wherein the horizontal vector is a first horizontal vector, and wherein the method further comprises:
    determining a second horizontal vector for the user based on the additional user gesture;
    comparing the second horizontal vector to the first horizontal vector; and
    if the second horizontal vector differs from the first horizontal vector by more than a threshold, then determining a new rotation matrix using the second horizontal vector.

5. The method of claim 1, wherein determining the vertical vector comprises determining a local direction of gravity using a sensor associated with the depth camera.

6. The method of claim 1, wherein determining the vertical vector comprises:
    recognizing an object in the field of view of the depth camera; and
    determining the vertical vector based on the orientation of the recognized object, the object being different from the user.

7. The method of claim 1, wherein determining the vertical vector comprises:
    receiving, by the depth camera, a vertical swipe gesture from the user at the camera, in response to the request, the received vertical swipe gesture a path defined by a bottom endpoint and a top endpoint; and
    determining the vertical vector based on the bottom endpoint and the top endpoint.

8. The method of claim 1, wherein determining the horizontal vector comprises:
    defining a vector based on the leftmost and rightmost end points; and
    normalizing the vector, thereby providing the horizontal vector.

9. The method of claim 1, wherein the horizontal swipe gesture is a hand gesture.

10. The method of claim 1, wherein determining the rotation matrix comprises:
    determining an orthonormal coordinate system defined by the horizontal vector, the vertical vector, and a third vector that is orthogonal to one or both the horizontal vector and the vertical vector;
    normalizing the horizontal, vertical, and third vectors; and
    generating a matrix by taking the normalized vectors as columns in a 3×3 matrix as the rotation matrix.

11. The method of claim 10, further comprising using one of the leftmost endpoint or the rightmost endpoint as the origin of the orthonormal coordinate system.

12. A non-transitory computer-readable medium having instructions thereon that when executed by one or more processors cause a process to be carried out for aligning a user's coordinate system with a depth camera's coordinate system to facilitate gesture recognition, the process comprising:
    receiving, at a depth camera, a gesture from a user across a horizontal axis, wherein the received gesture has a starting point on the horizontal axis and an ending point on the horizontal axis;
    determining a horizontal vector for the user based on the received user gesture, wherein the horizontal vector represents the horizontal axis of the user's coordinate system;
    determining a vertical vector, wherein the vertical vector represents the vertical axis of the user's coordinate system; and
    determining a rotation matrix relative to the coordinate system of the depth camera, based on the horizontal vector and the vertical vector, to convert positions of user gestures received by the depth camera to a frame of reference of the user, thereby aligning the user's coordinate system with the depth camera's coordinate system.

13. The medium of claim 12, the process further comprising:
    determining an orthonormal coordinate system defined by the horizontal vector, the vertical vector and a third vector that is orthogonal to one or both the horizontal vector and the vertical vector; and
    using the orthonormal coordinate system to determine the rotation matrix.

14. The medium of claim 13, wherein determining the rotation matrix comprises:
    normalizing the horizontal vector, the vertical vector and the third vector; and
    generating a matrix by taking the normalized vectors as columns in a 3×3 matrix as the rotation matrix.

15. The medium of claim 14, wherein determining an orthonormal coordinate system includes using the starting point as the origin of the orthonormal coordinate system.

16. An apparatus for gesture recognition, the apparatus comprising:
    a depth camera to receive a gesture from a user across a horizontal axis, the depth camera having a first coordinate system, and the user having a second coordinate system;
    a hand tracking module to determine a horizontal vector for the user based on the received user gesture and to determine a vertical vector, wherein the horizontal vector represents the horizontal axis of the user's coordinate system, and the vertical vector represents the vertical axis of the user's coordinate system; and a coordinate system transformation module to determine a rotation matrix relative to the coordinate system of the depth camera, based on the horizontal vector and the vertical vector, to convert positions of user gestures received by the depth camera to a frame of reference of the user, thereby aligning the user's coordinate system with the depth camera's coordinate system.

17. The apparatus of claim 16, further comprising: a gesture recognition module to recognize user gestures using the frame of reference of the user, wherein the hand tracking module determines the vertical vector by determining a local direction of gravity using a sensor associated with the camera.

18. The apparatus of claim 16, wherein the hand tracking module determines a horizontal vector by determining end positions of a path defined by the gesture, defining a vector based on the end positions, and normalizing the vector.

19. The apparatus of claim 16, wherein the received gesture has a starting point on a horizontal axis and an end point on the horizontal axis, and wherein the hand tracking module determines the horizontal vector using the starting point as the origin of the vector on the horizontal axis and the end point as a magnitude and a direction.

20. The method of claim 1, wherein the depth camera's coordinate system is defined by a horizontal axis and a vertical axis of the depth camera, and by a direction in which the depth camera is pointing.

* * * * *